2 Sheets
Sheet 1

C. H. McCormick.

Mower.

No.
No. 239

Patented Oct. 23, 1847.
Reissued May 24, 1853

2 Sheets
Sheet 2
C. H. McCormick.
Mower.
No
No 239
Patented Oct. 23, 1847.
Reissued May 24, 1853.
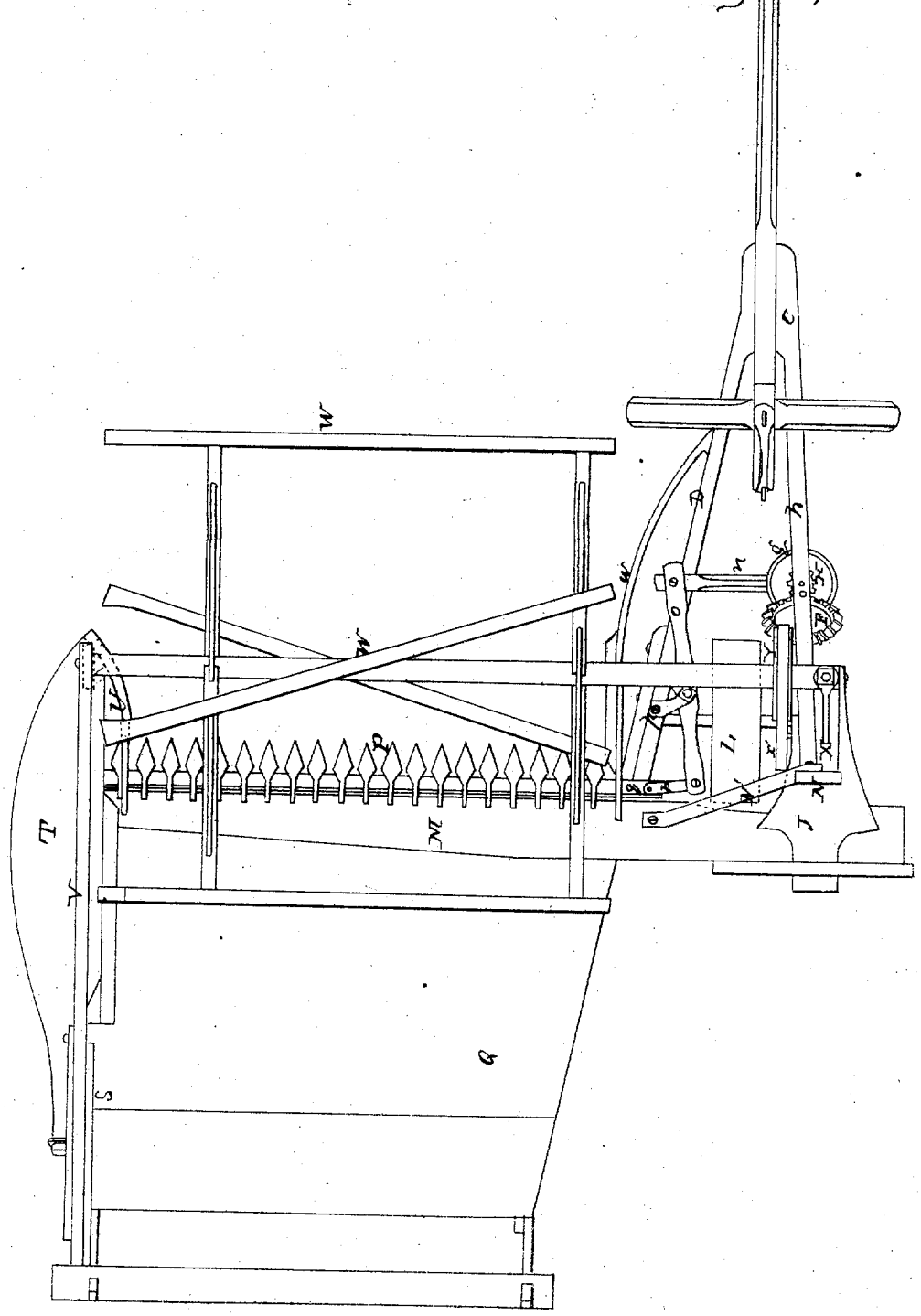

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853.

*To all whom it may concern:*

Be it known that I, CYRUS H. McCORMICK, of Chicago, Illinois, have invented new and useful improvements in the reaping-machine formerly patented by me; and I do hereby declare that the following is a full, clear, and exact description thereof, reference being had to the accompanying drawings, making part of this specification, in which—

Figure 1:
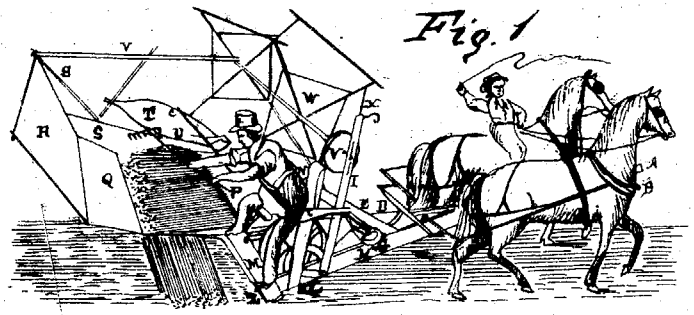
Figure 3:
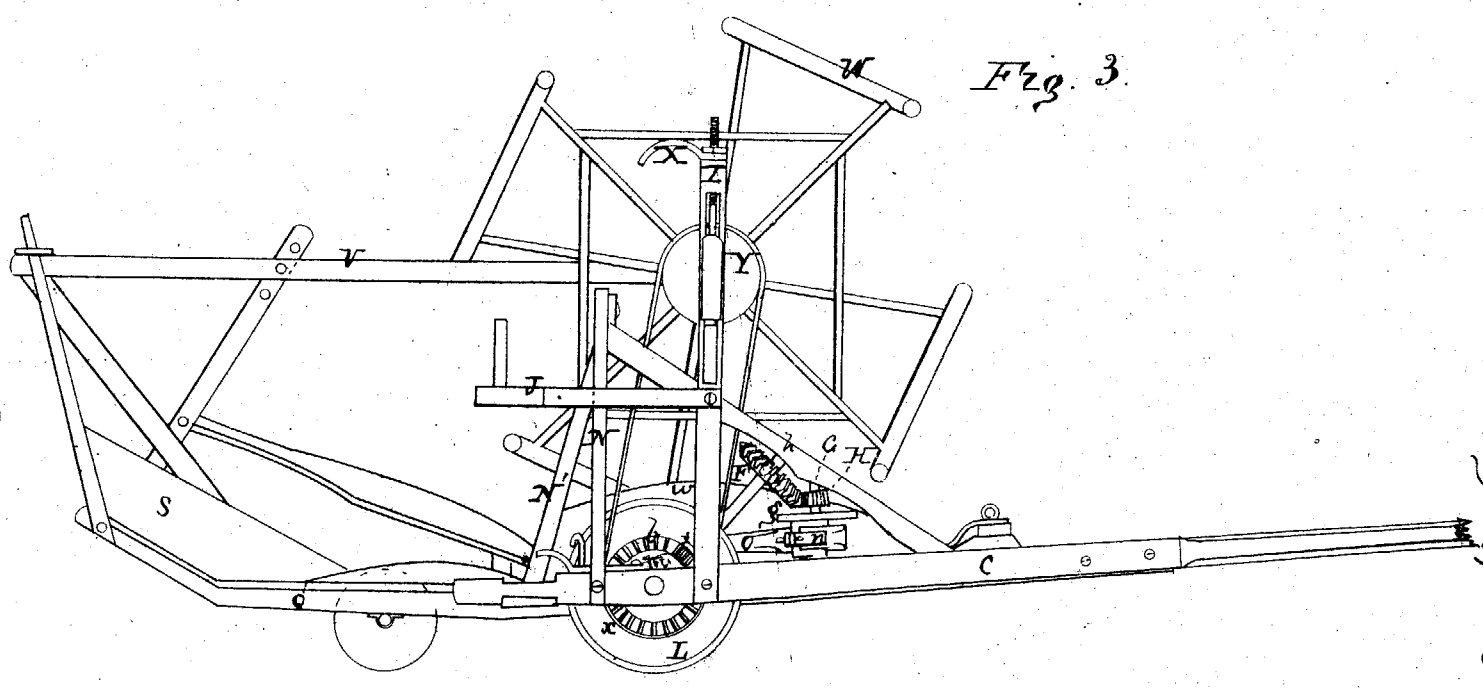

Figure 1 is a perspective view; Fig. 2, a plan, and Fig. 3 a side elevation.

The same letters indicate like parts in all the figures.

The reaping-machines heretofore made may be divided into two classes, the first class having a seat for a raker, who, with a band-rake having a head equal in length to the width of the swath cut, performs the double office of gathering the grain to the cutting apparatus and onto the platform and then of discharging it from the platform on the ground behind the machine. This was defective, for the reason that the labor to the operator was very great, as he had to reach over to enter the head of the rake in the uncut grain to gather it to the cutting apparatus and then to push it off at the back of the machine, but principally because the grain was discharged behind in the wake of the machine, rendering it necessary to gather and remove the grain before the return of the machine to prevent it from being trodden down by the horses. The defects of this first class were remedied by the second class, in which a reel was employed to gather the grain to the cutting apparatus and deposit it onto a platform, from whence it is raked off by an attendant, who deposits the grain on the ground by the side of the machine, where it can lay as long as desired, the whole width of the swath being left unencumbered for the passage of the horses on the return of the machine to cut another swath; but this latter class was still defective, for the reason that the reel, which performs in part the office of the raker in the other class, and in the performance of which office necessarily occupies the place which he occupied, left no place on the machine for the raker, so that it became necessary for the raker to walk on the ground by the side of the machine to perform the remaining duty of raking off the grain from the platform, which was attended with much labor and inconvenience—labor, because he must walk to keep up with the machine while he is operating the rake with his arms; and inconvenience, because, to enable him to get hold of the grain on the platform as the reel is revolving he must stand in the very place where the grain should be deposited to be properly laid. This second class was defective in the following particulars: The driving-wheel is placed forward of the mechanism that operates the vibrating sickle, and so far forward as to leave too much of the weight of the machine back of the driving-wheel, and therefore tending to strain the horses, as well as the frame of the machine, and the gearing which communicates motion to the crank is placed back of the driving-wheel, which is therefore subject to be clogged by sand, dirt, straw, &c., and in consequence of the relative position of the various parts the attendant is obliged to walk on the ground by the side of the machine to rake the cut grain from the platform as it is delivered and laid thereon by the reel. These defects, which have so much retarded the introduction into practical and general use of reaping-machines, I have remedied by my improvements, which consist in placing the driving-wheel farther back than heretofore and back of the gearing which communicates motion to the sickle, which is placed in a line back of the axis of the driving-wheel, the connection being formed by means of a lever and connecting-rod, thus placing the cog-gearing which operates the crank forward of the driving-wheel, for the purposes described, and bringing the driving-wheel sufficiently far back to balance the frame of the machine with the raker on it; and, also, in combining with the reel which deposits the grain onto the platform a seat or position for the raker to sit or stand and to give due support to the lower part of his body, that the upper part may be free to enable him to operate the rake with his arms, that he may have convenient access to the grain as the reel throws it down on the platform, and rake it off quickly with a free and natural sweep of his arms and deposit and lay it properly on the ground by the side of the machine in suitable quantities for being bound into sheaves.

In the accompanying drawings, M represents a flat beam, called the "finger-piece," to a part of the forward edge of which are secured the fingers P, such as are used in the machine heretofore patented by me, and under these fingers is arranged the vibrating sickle, which receives its vibrating motion in manner to be hereinafter described. The finger-piece is firmly attached at one end to the two oblique hounds C and D, which run toward each other and are bolted to the tongue A, the forward end of which passes through the breast-piece B. The team is harnessed to the tongue, hounds, and breast-piece in the usual or any desired manner. The axle of the driving-wheel L has its bearings in the two hounds, so near the back end thereof as just to leave room for the wheel to run clear of the finger-piece, and to the outer end of the axle of the driving-wheel is attached a beveled master cog-wheel, *l*, which communicates motion to a bevel-pinion, *l'*, on the lower end of an inclined arbor, to the upper end of which there is another beveled wheel, F, which communicates motion to the driver-pinion H on a vertical crank-arbor, G, that has a fly-wheel, *g*, on it between the crank and pinion. The crank-arbor has its bearings in the outside hound and the oblique brace *h*, and the inclined arbor has it supper bearing in the oblique brace and its lower end in a shifting-lever, *m*, by means of which the pinion *l'* can be thrown in and out of gear with the master bevel-wheel *l* when it is desired to reap or move the machine without reaping. A connecting-rod, *n*, from the crank extends horizontally to the forward end of the lever *o*, which turns on a fulcrum-pin, *p*, attached to the inside hound, and thence runs back to form a connection with the end of the sickle *q* by means of a short connecting-rod, *r*. By this arrangement of parts the gearing is placed forward of the driving-wheel, and motion is communicated from thence to the sickle back of the axis of the driving-wheel by the vibrating lever, thus placing the driving and supporting wheel back of the gearing and far enough to balance the weight of the frame, and the attendant or raker is placed on a seat, J, over one end of the finger-piece. This seat is straddled by the raker, so that he can either sit on it or stand with his feet on the frame, and with the seat between his legs to steady him laterally.

The seat J is attached to the seat-post N, which rises from the outside hound, and to the oblique brace *h*, and it is braced also by the diagonal wheel-brace N', which runs down from the post to the finger-piece M, near its junction with the inside hound. On the front of the seat there is a bar or plate, against which the raker can lean forward, and which will thus give him ample support when leaning forward to get at the grain without impeding the motion of his body. From this position, as represented in Fig. 1 of the drawings, the raker can get at the grain back of the reel, and by a natural sweep of his arms deliver it on the ground at right angles to the swath, as shown in the figure. To give free scope to the arms of the raker, the reel W is made shorter than usual at that end, instead of overlapping or extending beyond the range of fingers, and to prevent the grain or straw from passing under the frame or into the gearing which operates the sickle there is what I denominate a "wheel-board," *w*—that is, a curved board the forward end of which is secured to the inside hound. The forward end is curved to force the grain in toward the reel, and then it runs back to the platform Q, parallel with the plane of motion of the end of the reel. At the other end of the finger-bar there is a separator, T, or long finger, which projects beyond the points of the fingers P to separate the grain that is to be cut, and to the point and top of this is attached a metal guide or support, U, which extends back to the sickle to support the grain while being cut. The outer edge of the separator runs out in a curved line to force out the grain that is not to be cut and effect a perfect separation of it from the cut grain. At this end of the platform there is a board, *s*, to prevent the cut grain from dropping out on that side, and at the back there is a cloth screen to prevent its dropping out in the rear.

The reel W has its bearings at the outer end in the end of a horizontal beam, V, which is attached to the frame that supports the back screen, and further supported by braces, so as to avoid the use of a standard at that end, as heretofore, against which the grain strikes before it is separated; and the inner end of the reel has its bearing in a sliding box in a standard, I, attached to the outside hound and the diagonal brace *h*, the sliding box having a tapped stem running up above the standard, with a screw-nut, X, by means of which may with convenience be tightened the belt that runs from the driving-pulley *x'* (on the axle of the driving-wheel) over the pulley *y* on the axle of the reel.

What I claim as my invention, and desire to secure by Letters Patent, as improvements on the reaping-machine secured to me by Letters Patent bearing date the 21st of June, 1834, and the 31st of January, 1845, is—

1. Placing the gearing and crank forward of the driving-wheel for protection from dirt, &c., and thus carrying the driving-wheel farther back than heretofore, and sufficiently so as to balance the rear part of the frame and the raker thereon when this position of the parts is combined with the sickle back of the axis of motion of the driving-wheel by means of the vibrating lever, substantially as herein described.

2. The combination of the reel for gathering the grain to the cutting apparatus and depositing it on the platform with the seat or position for the raker arranged and located as described, or the equivalent thereof, to enable the raker to rake the grain from the platform and deliver and lay it on the ground at the side of the machine, as described.

C. H. McCORMICK.

Witnesses:
WM. H. BISHOP,
HIRAM CARPENTER.